United States Patent [19]

Brundbjerg et al.

[11] Patent Number: 4,906,431

[45] Date of Patent: Mar. 6, 1990

[54] METHOD OF PRODUCING A HEAT INSULATING SEPARATION WALL

[75] Inventors: Niels Brundbjerg, Gentofte, Denmark; Wolfgang Simm, Ecublens, Switzerland

[73] Assignee: Castolin S.A., Sulpice, Switzerland

[21] Appl. No.: 18,486

[22] Filed: Feb. 4, 1987

[30] Foreign Application Priority Data

Feb. 4, 1986 [CH] Switzerland .................. 424/86-0

[51] Int. Cl.$^4$ .............................................. G22F 1/00
[52] U.S. Cl. .................................. 419/9; 102/374; 427/190; 427/191; 427/419.2; 427/423; 427/427; 428/552; 419/19
[58] Field of Search ............. 428/552; 427/190, 419.2, 427/423, 427, 191; 419/9, 19; 102/374

[56] References Cited

U.S. PATENT DOCUMENTS

| | | | |
|---|---|---|---|
| 2,707,691 | 5/1955 | Wheildon, Jr. ............... | 200/144 R |
| 3,261,673 | 7/1966 | Wheildon, Jr. ............... | 428/552 |
| 3,990,860 | 11/1976 | Fletcher et al. ............. | 428/552 |
| 4,095,003 | 6/1978 | Wheatherly et al. .......... | 428/552 |
| 4,399,199 | 8/1983 | McGill et al. ............... | 428/552 |
| 4,582,678 | 4/1986 | Niino et al. ................ | 428/552 |
| 4,649,084 | 3/1987 | Hale et al. ................. | 428/552 |
| 4,678,633 | 7/1987 | Osaki et al. ................ | 428/552 |

*Primary Examiner*—Stephen J. Lechert, Jr.
*Attorney, Agent, or Firm*—Hopgood, Calimafde, Kalil, Blaustein & Judlowe

[57] ABSTRACT

The present invention relates to a heat insulating separation wall between the combustion chamber of a solid fuel rocket and a chamber containing an electronic control installation of said rocket.

14 Claims, No Drawings

METHOD OF PRODUCING A HEAT INSULATING SEPARATION WALL

In solid fuel rockets in which electronic control devices are lodged in the vicinity of the combustion chamber, it is necessary to provide a thermal barrier between the combustion chamber and the chamber containing the electronic control devices, during the combustion of the fuel in order to prevent a premature destruction of said control devices.

It has already been tried to use steel materials of various compositions for forming separation walls of various thickness, but the results were not satisfactory. Another solution was sought by using sintered ceramic separation walls which are liable to provide sufficient thermal insulation. However, the brittleness of the material lead to problems of construction, in particular regarding the fixation of such separation walls, with resulting relatively high costs.

It is an object of the invention to provide a heat insulating separation wall, which can be used constructionally in a simple and cost-saving manner and which guarantees at least a short-time heat insulation even in extreme cases.

Stating it broadly, one embodiment of the invention is directed to a heat insulated separation wall for a chamber of a solid fuel rocket containing an electronic control installation for said rocket. The separation wall comprises a plate-shaped metal base body or substrate to which has been bonded a thermal barrier based on a refractory oxide selected from the group consisting of $Al_2O_3$ and $ZrO_2$, the thermal barrier layer characterized by a density of about 80% to 97% compared to the theoretical density of the corresponding material in the sintered state. Generally the density may range between about 80 to 90%.

In carrying out the method, the separation wall is applied to the substrate by thermal spraying to a thickness of 0.5 to 2.5 mm, and preferably to 0.8 and 1.5 mm.

In a preferred embodiment, a bond layer is first applied to a metal base body or substrate by thermally spraying a Ni-, Co-, or Fe-base alloy to a thickness of less than about 0.2 mm, or to a thickness of between 0.05 to 0.15 mm.

More specifically the bond alloys may comprise by weight the following: (1) an alloy containing 1–15% Al, 2–10% Mo, 0 to 0.5% C, and the balance essentially nickel; (2) 2–30% Al, 0 to 0.5% C, and the balance essentially nickel; (3) 5–35% Cr, 2–15% Al, 0 to 0.5% C, 0.05–3% Y, and the balance essentially either Ni, Co and/or Fe.

Preferably the method is characterized in that the material used to spray-form the thermal barrier layer is substantially $ZrO_2$ containing by weight one or more of the oxides CaO, MgO, $Al_2O_3$, $Y_2O_3$ and $SiO_2$. The amount of oxides added to $ZrO_2$ may range up to 30% CaO or MgO, or up to 20% $Y_2O_3$, or up to 10% $SiO_2$ and the balance essentially $ZrO_2$.

In another embodiment of the method, the spray material is substantially $Al_2O_3$ with additions by weight of one or more of the oxides $TiO_2$, $SiO_2$, $ZrO_2$ and MgO. Thus, the mixture with $Al_2O_3$ may contain by weight up to 50% of $TiO_2$, or up to 10% $SiO_2$, or up to 30% of $ZrO_2$ or MgO, with $Al_2O_3$ making up essentially the balance.

Accordingly, oxide-ceramic materials with a melting temperature above 800° C., in many cases above 2000° C., and with a heat conductivity of less than 0.1 cal/cm.s° C., preferably of less than 0.02 and 0.05 cal/cm.s° C., are preferably used for the thermal barrier layer.

Further, preferably, a bond layer is first applied on the base body whereas said bond layer has the preferred compositions specified in claims 7 to 10.

The thermal barrier produced by thermal spraying according to the invention has a relatively high porosity which results in a reduction of its thermal conductivity. In particular, the density of the thus obtained thermal barrier layer is comprised between 80 and 97% of the theoretical density which is exhibited by the material in the sintered state.

The thermal spraying process for applying the thermal barrier layer and the bond layer can, in particular, be autogeneous flame spraying, the spraying material being supplied as powdered material or as wire or rod. The desired density of the thermal barrier layer can easily be reached by an appropriate choice of the spraying distance. The thermal barrier layer can also be sprayed in a plasma installation, whereas such process is particularly suitable for automatization of the process.

EXAMPLE

On a separation wall of steel plate of 4.0 mm thickness and 300 mm diameter a thermal barrier layer was applied in the following manner.

After preparing the surface of the steel plate by sandblasting with corundum of a grain size of 0.5 to 1.0 mm, a bond layer was applied by thermal spraying with the following powdered material (composition in percent by weight):

Al 9.0
C 0.1
Cr 26.0
Fe remainder

On this bond layer a thermal barrier layer composed of 80 percent by weight of $ZrO_2$ and 20 percent by weight of CaO was then sprayed. To that effect, an autogeneous flame spray apparatus with an oxygen pressure of 4 bar and an acetylene pressure of 0.8 bar was used.

For the spraying of the bond layer a spraying distance of 180 mm was used, the powder feeding rate was 3.0 kg/h and air was supplied with a pressure of 2 bar for acceleration. The thickness of the bond layer was 0.15 mm.

The thermal barrier layer was sprayed from a distance of 140 mm with a powder feeding rate of 1.1 kg/h whereas air with a pressure of 4 bar was applied for acceleration. The thickness of the thermal barrier layer was 1.0 mm and its density corresponded to 85% of the theoretical density of the material. The thermal conductivity of the material was measured on sintered samples having 98% of the theoretical density and had a value between 0.015 and 0.02 cal/cm. s° C. The melting point of the oxide-ceramic material is near 2150° C.

The separation wall produced in this way was used in a solid fuel rocket between the combustion chamber and a chamber housing the electronic control devices of the rocket, with the result of only a slight increase of the temperature of the electronic installation during the combustion of the propulsing fuel.

We claim:

1. A method for producing a heat-insulated separation wall between a combustion chamber of a solid fuel rocket and a chamber containing an electronic control installation for controlling said rocket, wherein said separation wall comprises a plate-shaped metallic base body or substrate which comprises: thermally spraying a ceramic composition selected from the group consisting of Al₂O₃-base and ZrO₂-base materials on said plate-shaped metal base such as to produce a thermal barrier layer having a density ranging between 80 to 97% of the theoretical density of the corresponding material in the sintered state.

2. A method for producing a heat-insulated separation wall between a combustion chamber of a solid fuel rocket and a chamber containing an electronic control installation for controlling said rocket, wherein said separation wall comprises a plate-shaped metallic base body or substrate which comprises:

first thermally spraying a metal bond layer of thickness of less than 0.2 mm onto said plate-shaped metal base, said bond layer being selected form the group consisting of the following alloys:

(1) an alloy containing 1–15% Al, 2–10% Mo, 0.0.5% C and the balance essentially Ni; (2) 2–30% Al, 0–0.5% C, and the balance essentially Ni; and (3) 5–5% Cr, 15% Al, 0–0.5% C, 0.05–3% Y, and the balance essentially Ni, Co, and/or Fe;

and then thermally spraying on said plate-shaped metal base a ceramic composition selected from the group consisting of Al₂O₃-base and ZrO₂-base material such as to produce a thermal barrier having a thickness ranging from 0.5 to 2.5 mm and a density ranging between 80 to 97% of the theore-tical density of the corresponding material in the sintered state, said ceramic composition being such that, when based on Al₂O₃, the composition contains by weight up to 50% TiO₂, or up to 10% SiO, or up to 30% of ZrO₂or MgO, and the balance essentially Al₂O₃, and said ceramic composition being such that, when based on ZrO₂, the composition contains by weight up to 30% CaO or MgO or Al₂O, or up to 20% Y₂O₃, or up to 10% SiO₂, and the balance essentially ZrO₂.

3. Method according to claim 1, characterized in that first a bond layer is applied on the base body by thermal spraying of Ni-, Co- or Fe- base alloy in a thickness of less than 0.2 mm.

4. Method according to claim 3, characterized in that the thickness of the bond layer is between 0.05 and 0.15 mm.

5. Method according to one of the claims 1, 3 and 4, characterized in that the thickness of the thermal barrier layer is between 0.8 and 1.5 mm.

6. Method according to one of the claims 1 and 3 to 5, characterized in that the density of the thermal barrier layer is between 80 and 90% of the said theoretical density.

7. Method according to one of the claims 3 to 6, characterized in that the spraying material used for the bond layer is an alloy containing in percent by weight, 1.0 to 15.0 Al, 2 to 10 Mo, 0 to 0.5 C, remainder Ni.

8. Method according to one of the claims 3 to 6, characterized in that the spraying material used for the bond layer is an alloy containing in percent by weight, 2.0 to 30.0 Cr, 2.0 to 15.0 Al, 0 to 0.5 C, remainder Ni or Fe.

9. Method according to one of the claims 3 to 6, characterized in that the spraying material used for the bond layer is an alloy containing in percent by weight, 2.0 to 30.0 Al, 0 to 0.5 C, remainder Ni.

10. Method according to one of the claims 3 to 6, characterized in that the spraying material used for the bond layer is an alloy containing in percent by weight, 5.0 to 35.0 Cr, 2.0 to 15.0 Al, 0 to 0.5 C, 0.05 and 3.0 Y, remainder Ni, Co and/or Fe.

11. Method according to one of the claims 1 and 3 to 10 characterized in that the spraying material used for the thermal barrier layer is ZrO₂ with additions of one or more of the oxides CaO, MgO, Al₂O₃, Y₂O₃ and SiO₂.

12. Method according to claim 11, characterized in that the spraying material used for the thermal barrier layer is a mixture of ZrO₂ and, with respect to the weight of the whole mixture, up to 30 percent by weight of CaO or MgO or Al₂O₃, or up to 20 percent by weight of Y₂O₃, or up to 10 percent by weight of SiO₂.

13. Method according to one of the claims 1 and 3 to 10, characterized in that the spraying material used for the thermal barrier layer is Al₂O₃ with additions of one or more of the oxydes TiO₂, SiO₂, ZrO₂ and MgO.

14. Method according to claim 13, characterized in that the spraying material used for the thermal barrier layer is a mixture of Al₂O₃ and, with respect to the weight of the whole mixture, up to 50 percent by weight of TiO₂, or up to 10 percent by weight of SiO₂, or up to 30 percent by weight of ZrO₂or MgO.

* * * * *

UNITED STATES PATENT AND TRADEMARK OFFICE
CERTIFICATE OF CORRECTION

PATENT NO. : 4,906,431
DATED : March 6, 1990
INVENTOR(S) : Niels Brundbjerg et al It is certified that error appears in the above-identified patent and that said Letters Patent is hereby corrected as shown below:

column 3, line 25, "5-5% Cr" should be -- 5-35% Cr -- ;

and "15% Al" should be -- 2-15% Al -- .

Signed and Sealed this

Second Day of July, 1991

*Attest:*

HARRY F. MANBECK, JR.

*Attesting Officer*      *Commissioner of Patents and Trademarks*